United States Patent
Chiu et al.

(10) Patent No.: US 9,369,333 B1
(45) Date of Patent: Jun. 14, 2016

(54) SYSTEM AND METHOD FOR CENTRALIZING OUTBOUND COMMUNICATIONS BETWEEN AN EMAIL SYSTEM AND A THIRD PARTY SERVICE

(71) Applicant: Google Inc., Mountain View, CA (US)

(72) Inventors: Bikin Chiu, Ontario (CA); Yaar Schnitman, Mountain View, CA (US); Shalini Agarwal, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 143 days.

(21) Appl. No.: 13/891,931

(22) Filed: May 10, 2013

(51) Int. Cl.
*G06F 15/16* (2006.01)
*H04L 12/24* (2006.01)
*H04L 12/58* (2006.01)
*G06Q 10/10* (2012.01)

(52) U.S. Cl.
CPC ............ *H04L 41/026* (2013.01); *G06Q 10/107* (2013.01); *H04L 12/5885* (2013.01)

(58) Field of Classification Search
CPC . G06Q 10/107; H04L 12/5885; H04L 41/026
See application file for complete search history.

(56) References Cited

U.S. PATENT DOCUMENTS

| | | | | |
|---|---|---|---|---|
| 7,949,714 | B1* | 5/2011 | Burnim | 709/206 |
| 2006/0010224 | A1* | 1/2006 | Sekar et al. | 709/217 |
| 2011/0179362 | A1* | 7/2011 | Craddock et al. | 715/752 |

OTHER PUBLICATIONS

Google., Rich snippets (microdata, microformats, RDFa, and Data Highlighter) Retrieived from http://support.google.com/webmasters/bin/answer.py?hl=en&answer=99170 [retrieved on May 17, 2013].
Schema.org, Retrieved from http://schema.org/Event [retrieved on May 17, 2013].
Schema.org, Retrieved from http://schema.org/Offer [retrieved on May 17, 2013].
Schema.org, Retrieved from http://schema.org/Place [retrieved on May 17, 2013].
Shema.org, Retrieved from http://schema.org/Review [retrieved on May 17, 2013].

* cited by examiner

*Primary Examiner* — Andrew Georgandellis
(74) *Attorney, Agent, or Firm* — Birch, Stewart, Kolasch & Birch, LLP

(57) ABSTRACT

A publisher service is disclosed which centralizes outbound communications between an email system and a third party service. The service receives a recipient response to an enhanced email to be sent to a third party service and acquires the email associated with the recipient response. The service then obtains sending instructions based on the enhanced email and sends the response to the third party service using the sending instructions.

16 Claims, 13 Drawing Sheets

| FROM | SUBJECT | DATE |
|---|---|---|
| Work | Client Request | Jan. 30 |
| Airlines Inc. | Reservation for Maui, Hawaii | Jan. 30 |
| Mom | (no subject) | Jan. 30 |
| Heidi H. | Invitation to Molly's Birthday Party!! | Jan. 29 |
| Doug G. | Re: Plans this weekend? | Jan. 28 |
| Car Service LLC | Reservation for February 11, 2013 | Jan. 27 |
| Package Shipping Co. | Your Order has Shipped! | Jan. 26 |
| Sam D. | (no subject) | Jan. 25 |
| Shalini A. | Technical Question | Jan. 24 |
| Bikin C. | Re: Design Proposal | Jan. 23 |

FIG. 1

```
<div itemscope itemtype="http://schema.org/Event">
    <div itemprop="name"><strong>Molly's 4th Birthday</strong></div>
    <div itemprop="description">Molly's 4th Birthday</div>
    <div><meta itemprop="startDate" content="2013-02-06T16:00">Starts: 02/06/2013 4:00PM</div>
        <meta itemprop="endDate" content="2013-02-06:00.000">Ends: 2013-02-06:00.000
        <meta itemprop="duration" content="0000-00-00T02:00">Duration: 02:00
    </div>

<div itemprop="location" itemscope itemtype="http://schema.org/PostalAddress">
        <div itemprop="streetAddress">Bounce House</div>
    </div>

<div itemprop="action" itemscope itemtype="http://schema.org/RsvpAction">
        <div itemprop="handler" itemscope
            itemtype="http://schema.org/HttpActionHandler">
            <meta itemprop="url" content="http://mysite.com/rsvp?id=123&user=xyz&rsvp=yes">YES</a>
            <link itemprop="method"
                href="http://schema.org/HttpRequestMethod/POST"/>
            <div itemprop="requiredProperty" itemscope itemType="http://schema.org/Property">
                <meta itemprop="name" content="attending"/>
                <div itemprop="rangeIncludes" itemscope itemtype="http://schema.org/Class"/>
                    <meta itemprop="url" content="http://schema.org/RsvpAttendance/YES"/>
                </div>
                <div itemprop="rangeIncludes" itemscope itemtype="http://schema.org/Class">
                    <meta itemprop="url" content="http://schema.org/RsvpAttendance/No"/>
                </div>
                <div itemprop="rangeIncludes" itemscope itemtype="http://schema.org/Class">
                    <meta itemprop="url" content="http://schema.org/RsvpAttendance/Maybe"/>
                </div>
            </div>
        </div>
    </div>
</div>
```

| FROM | SUBJECT | DATE |
|---|---|---|
| Work | Client Request (601) | Jan. 30 |
| Airlines Inc. | Reservation for Maui, Hawaii (602) [Check In] | Jan. 30 |
| Mom | (no subject) (603) | Jan. 30 |
| Invite System | Invitation to Molly's Birthday Party!! (604) RSVP (FEB 6, 4pm) [YES] [NO] [MAYBE] | Jan. 29 |
| Doug G. | Re: Plans this weekend? (606) | Jan. 28 |
| Car Service LLC | Reservation for February 11, 2013 (607) [CONFIRM] | Jan. 27 |
| Package Shipping Co. | Your Order has Shipped! (608) [TRACK PACKAGE] | Jan. 26 |
| Sam D. | (no subject) (609) | Jan. 25 |
| Shalini A. | Technical Question (610) | Jan. 24 |
| Bikin C. | Re: Design Proposal (611) | Jan. 23 |

FIG. 6

| FROM | SUBJECT | DATE |
|---|---|---|
| Work | Client Request (201) | Jan. 30 |
| Airlines Inc. | | |
| Mom | | |
| Invite System | Invitation to | |
| Doug G. | | |
| Car Service LLC | | |
| Package Shipping Co. | | |
| Sam D. | | |
| Shalini A. | | |
| Bikin C. | | |

From: InviteS
To: Me
Subject: Invitation to Molly's Birthday Party

Sent: 01/29/13

You're Invited to Molly's 4th Birthday!

When: Wednesday, February 6, 2013
4:00 PM – 6:00 PM

Where: Bounce House

Will you attend?

[ YES ]  [ MAYBE ]  [ NO ]

FIG. 7

SYSTEM AND METHOD FOR CENTRALIZING OUTBOUND COMMUNICATIONS BETWEEN AN EMAIL SYSTEM AND A THIRD PARTY SERVICE

BACKGROUND

Electronic mail, or email, is a powerful communication tool that allows information to be exchanged nearly instantaneously. However, the ease of sending email can result in a recipient receiving vast amounts of email to his or her inbox as illustrated in FIG. 1. In addition to email sent by actual people, a recipient may receive hundreds of email generated by machines from third party services such as airlines, invitation generating companies, courier services, and social media sites. These emails may include confirmations, notifications, promotions, social media updates, and messages from collaboration systems. There should be an easy way for a recipient to understand the contents of email and expected responses, if any, in order to efficiently process the email the recipient receives.

Some of the email within a recipient's inbox may require or induce action from the recipient. Other email may provide the recipient with a status such as an email containing information about a package shipment Email should be extensible and annotated in such a way that a recipient can clearly understand the content of the email and easily interact with the email in order to process the email's contents. Furthermore, a recipient should be allowed to interact with email annotations in an email system directly, without having to open email or being directed to a third party site to provide a response. For example, there may be annotations associated with email in order to check in for a flight. The recipient of such an email should be able to interact with an annotation that allows a recipient to check in for the flight without having to visit the airline's website or even opening the flight check-in email. Other examples may include RSVPing for an event, saving an offer, rating a movie, tracking a package, approving an expense report, or accepting a friend request. Annotations should be clear and provide a way in which a recipient can easily interact and process email.

SUMMARY

This specification describes technologies relating to an email system in general, and specifically to methods and systems for centralizing outbound communications between an email system and a third party service.

In general, one aspect of the subject matter described in this specification can be embodied in a system and method for centralizing outbound communications between an email system and a third party service. An exemplary system may include one or more processing devices and one or more storage devices storing instructions that, when executed by the one or more processing devices, cause the one or more processing devices to: receive a recipient response to an enhanced email to be sent to a third party service; acquire the enhanced email associated with the recipient response; obtain sending instructions based on the enhanced email; and send the response to the third party service using the sending instructions. An exemplary method may include receiving a recipient response to an enhanced email to be sent to a third party service; acquiring the enhanced email associated with the recipient response; obtaining sending instructions based on the enhanced email; and sending the response to the third party service using the sending instructions.

A second aspect of the subject matter described in this specification can be embodied in a system and method for providing annotations associated with emails to a recipient and allowing the recipient to interact with email annotations. An exemplary system may include one or more processing devices and one or more storage devices storing instructions that, when executed by the one or more processing devices, cause the one or more processing devices to: receive email; determine whether a received email has an associated annotation; responsive to determining that a received email has an associated annotation, store the email and associated annotation in persistent storage; receive a request to access email for a specific recipient; generate visual representations for the emails having associated annotations; and display an email listing including at least one received email having an associated annotation, the email listing containing the visual representation of the annotation related to the email. An exemplary method includes: receiving email; determining whether a received email has an associated annotation; responsive to determining that a received email has an associated annotation, storing the email and associated annotation in persistent storage; receiving a request to access email for a specific recipient; generating visual representations for the emails having associated annotations, and displaying an email listing including at least one received email having an associated annotation, the email listing containing the visual representation of the annotation related to the email.

These and other embodiments can optionally include one or more of the following features: sending instructions may be obtained from structured data associated with the enhanced email; sending the response to the third party service may comprise sending an SMTP or HTTP message to the third party service; an open standard for authentication may be used to support authenticated requests to third party services; an open standard for authentication may be OAuth2, sending the response to the third party service include sending an email on behalf of the recipient to the third party service; a response from the third party service may be obtained and the response may be written to persistent storage; responses may be resent to the appropriate third party services if the responses have not been successfully communicated to the services; sending responses may be delayed for a specified period of time; an annotation may be an actionable item; the visual representation may be displayed in-line with other email information; the visual representation may be displayed as an interactive widget which a recipient can open and use to respond to the action; the visual representation may be displayed prior to the recipient interacting with the email; the visual representation may be generated based on an annotation category; associated annotations may be determined by parsing email text, associated annotations may be determined by using artificial intelligence; associated annotations may be determined by reading the email's associated structured data; enhancement information may be acquired and associated with the email; enhancement information may be acquired from the email's associated structured data or a third party site; a recipient response to the annotation may be received; and the received response may be associated with the corresponding email, stored, and send to the third party service that sent the email.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 is a user interface illustrating a customary email display.

FIG. 4 is example structured data associated with an interactive email.

FIG. 6 is a user interface illustrating exemplary visual representations of annotations associated with email.

FIG. 7 is a user interface illustrating an exemplary visual representation of an annotation associated with an email.

DETAILED DESCRIPTION

Figure 2:
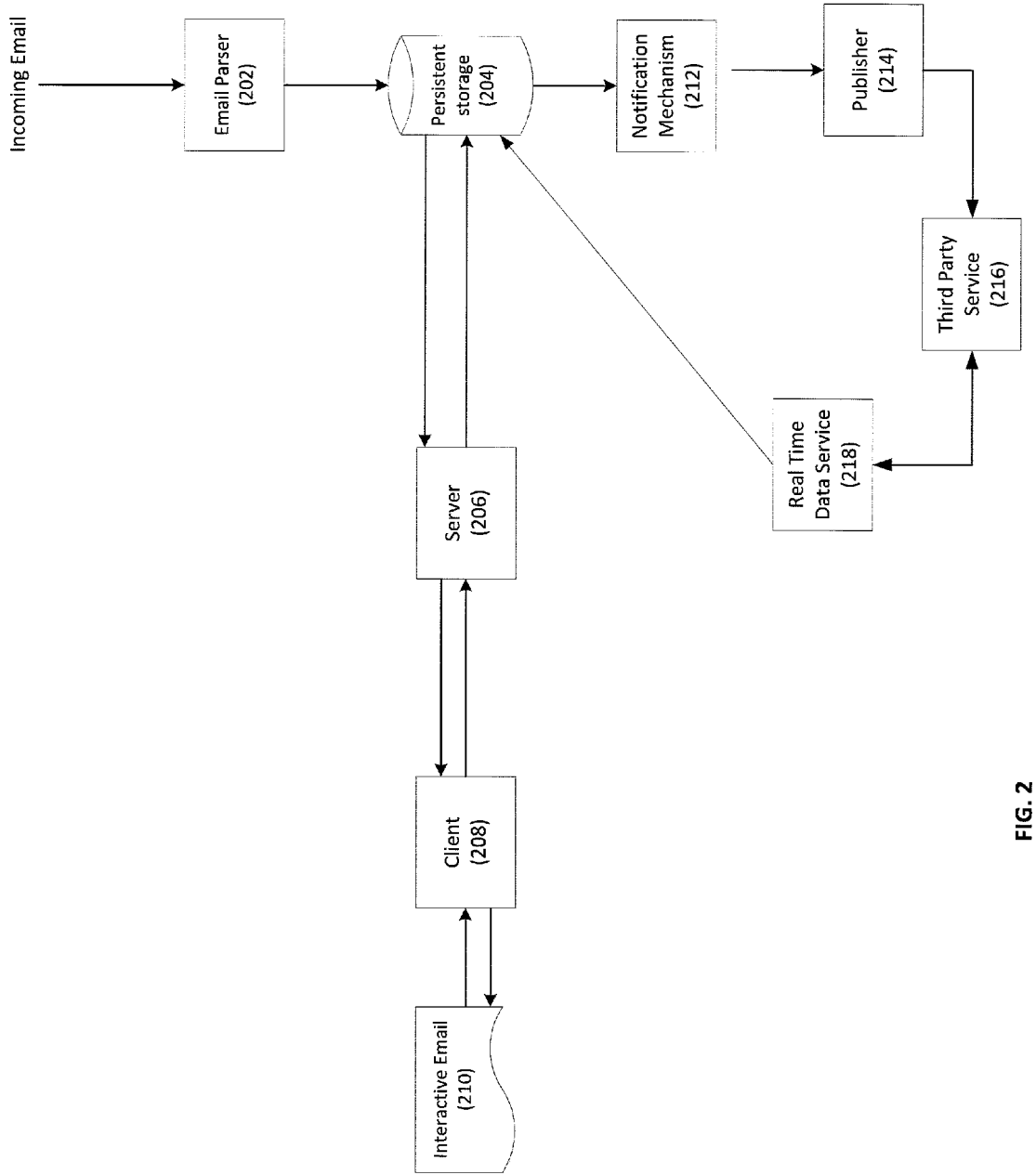
FIG. 2 is a user interface illustrating an exemplary email system.

According to an exemplary embodiment, an email system may display an email having an associated annotation to an email recipient and allow the recipient to interact with the annotation without requiring the recipient to leave the email system or even open the email. FIG. 2 illustrates an exemplary email system in which emails are annotated and shown to a recipient in a clear manner and with which a recipient can easily interact.

An email delivery service may deliver incoming email to an email parser. The email parser (202) may extract semantics (nouns and verbs) from HTML email so that an email recipient can easily process email. The parser may use HTML parsing or schema.org structured data as discussed below to determine nouns and verbs associated with email. The parser may parse things including: potentially actionable items or items related to people, places, things, events, changeable statuses, or other items that may provide a recipient helpful information regarding the content of email. The parsed items may be used to determine the appropriate annotations to associate with the email. The resulting annotations are associated with the email and stored in storage (204). When a client (208) requests the email, the email's associated annotations may be transformed to a different representation, checked to make sure information is complete, and additional contextual information may be added if necessary. The client (208) may then receive the email along with the annotation representations and additional contextual information. The client may display the received information to an email recipient via an interactive widget, an in-line display, or some other interactive mechanism that allows the recipient to process the email without requiring the recipient to open the email. Client side rendering may be different depending on the email client. Web email clients may display annotated emails differently than mobile email clients. Additionally, the annotations may be added automatically to a user's calendar without the user having to take action.

Figure 3:
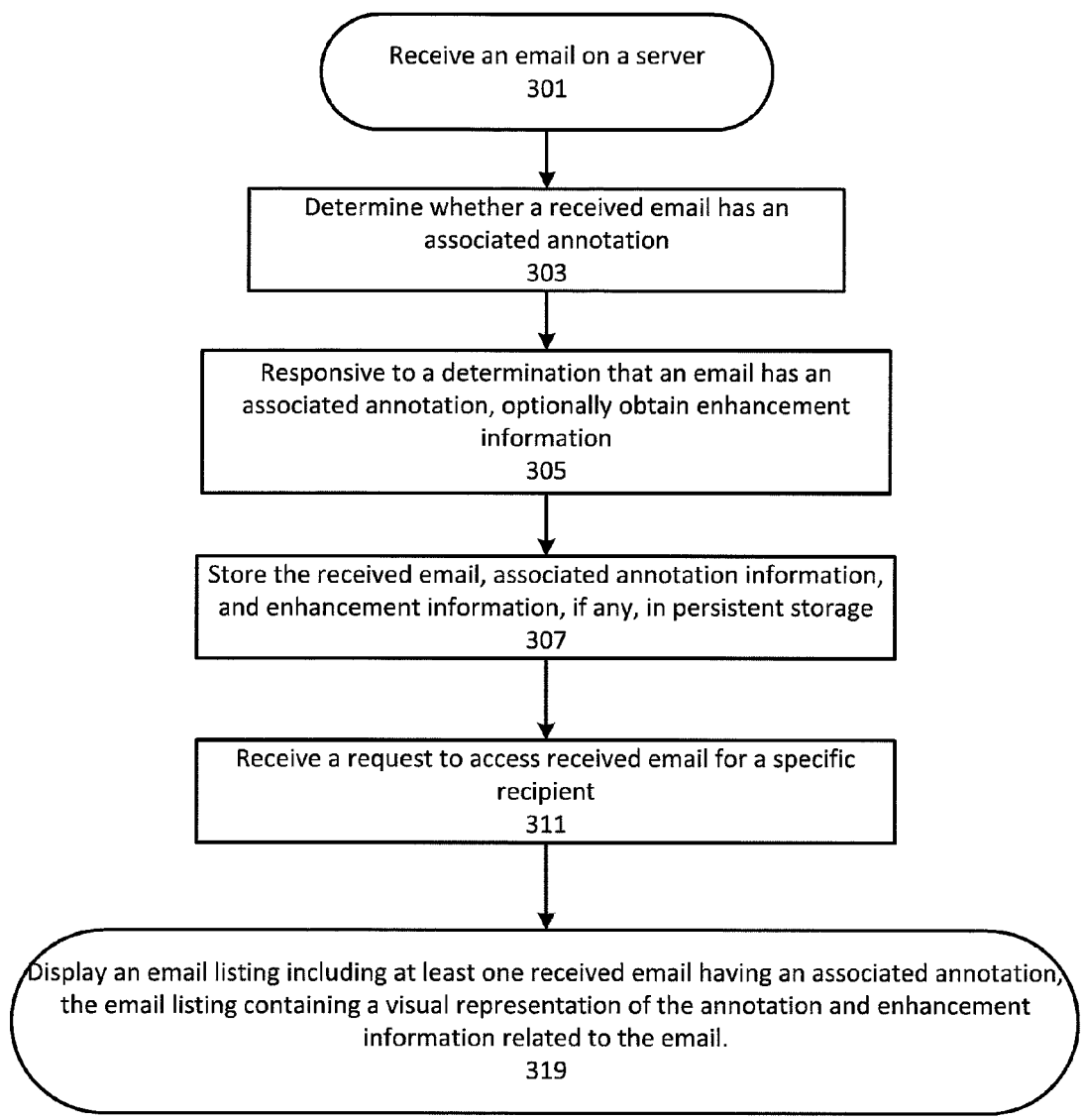
FIG. 3 is a flow diagram of an exemplary method for providing annotations associated with email to a recipient.

An exemplary method for displaying annotated email that can be quickly processed begins by receiving email on a server as illustrated in FIG. 3 (301). The email text or content may be parsed to find semantics, potentially actionable items or items related to people, places, things, events, changeable statuses, or other items that may provide a recipient helpful information regarding the content of the email. Parsing may help determine whether a received email should be annotated as shown in FIG. 3 (303).

Email may be parsed using artificial intelligence, machine learning, regular expressions, natural language parsing, context-free grammars, or other parsing rules to find text and content that may provide context for the content of an email. For example, an email may contain a tracking number for a shipped package. This tracking number may be recognized by a machine based on a regular expression that was written to find numbers in a specific format used by courier services to identify packages. The tracking number signifies to the email system that the email should be displayed with an annotation such as a "track package" button, action, or some other mechanism for the recipient to view the status of the package.

Although helpful information regarding the content of the email can be directly parsed from email text using machine learning, some email senders may want to control the annotations shown to a recipient instead of relying on artificial intelligence or text-parsing tools to detect the appropriate email items for annotating email. For example, an email sender may want to send an email that is an invitation to a party as shown in FIG. 7. The party invitation may require an RSVP from the recipient and the RSVP choices may be: yes, no, or maybe. In order for an email system to recognize the email as an invitation that requires an RSVP with three possible responses, the email sender may choose to include a mechanism such as structured data, markup, or metadata (referred to as structured data) that allows the sender to designate actionable items and possible responses within the email.

An email sender can use structured data to designate annotations, import text, and action response choices that should be associated with an email. Structured data is an HTML standard specification that can be read by an exemplary email system in order to provide appropriate annotations for an email. An email sender can use a structured data schema, such as a schema provided by Schema.org, to designate certain information about the email including the type of annotation that should be associated with the email, the information that should be associated with the annotation, and the possible actions and responses that a recipient should be able to perform. Structured data may contain metadata which includes instructions for sending responses back to the email sender. Structured data may be embedded into email and may be invisible to recipients. The embedded structured data can be used by email services or clients, like an exemplary email system, to make decisions about how to display and process the email which contains the structured data.

Schemas may be created for several types of emails including emails regarding ordering, ratings items, reservations, event attendance, package tracking, and other generic action handlers that can be determined by the sender. For example, a pharmacy could use a SaveAction to create a "Refill prescription" button action. FIG. 4 illustrates example structured data for an event that may be used by an email sender for sending an email invitation to a party such as the one shown in FIG. 7. The structured data type is designated as an event with a name of "Molly's 4$^{th}$ Birthday." The event is described as "Molly's 4$^{th}$ Birthday," with a start date of Feb. 6, 2013 at 4 pm and an end date of 6 pm, Feb. 6, 2013. The example structured data includes the location, the duration, and the possible response actions that the recipient may perform. In the RSVP example of FIG. 7, there are three possible responses as illustrated by the visual representation: (1) responding "yes" to the event, (2) responding "no," or (3) responding "maybe" as shown in FIG. 7. These responses may be defined by the sender using the Event structured data FIG. 4, where the three responses: yes, maybe, and no are defined by sections 401*a*, 401*b*, and 401*c* respectively.

An exemplary email system can parse a structured data schema associated with an email using the email parser. Annotations can then be generated for an email based on the associated structured data. For example, for the event defined by the structured data of FIG. 4, an annotation may be associated with the email such as the RSVP annotation shown in FIG. 6 containing helpful information regarding the event as well as the possible responses which the recipient may perform.

An exemplary email system can classify email into categories based on parsed information from the email content or structured data. Annotations can be chosen for an email based on its classification type. After determining the annotations to associate with an email, an exemplary system may store the email and its associated annotations. Annotations may include information regarding the content of email. Annotations may be snippets that include pictures, text, or mechanisms for response such as user clickable buttons and checkboxes. Annotations may also include information regarding how to carry out actions associate with email. Annotations and their associated original emails may be stored together or completely separately. In some embodiments, parsed information is stored in addition to the actual annotations or instead of the actual annotations. If the annotations are not stored, they may be determined based on the parsed information when a client fetches an email from the server.

Microclusters may also be created that combine categories in order to display annotations to a user. For example, an email may contain information about a trip to New York that discusses flight information, hotel and restaurant reservations, concert tickets, and Broadway shows that the user would like to see. Annotations may be made for details associated with the trip.

In addition to the annotations based on the information parsed from email either by artificial intelligence or structured data, an exemplary email system may optionally enhance a recipient's email experience by providing enhancement information pertaining to an email that was not included with the original email as illustrated by FIG. 3 (305). This enhancement information may be contextual information that is appropriate given the email content. For example, based on the content of an email, an exemplary email system may provide a map, business hours, directions, photos, youtube channels, Internet links, or other relevant information.

Enhancement information may also be based on the classification of the email. As discussed above, an email may be classified as a particular type of email based on parsed information. Each email classification certain characteristics. An email containing a reservation may be classified as a reservation email. An email containing information about an event may be an invite email. If a recipient is asked to rate something, the email may be a rating email. There may be several additional types of email. Additional information may be acquired for the email display based on the classification of the email. For example, a recipient may receive an email regarding a reservation at a restaurant. The email may therefore be classified as a reservation email. The exemplary email system may display an annotation associated with the email as an actionable annotation to accept the reservation or modify the reservation which may have been found in the email. The email system may also acquire additional reservation information regarding the location, if the location is a restaurant, the menu, and/or pictures of the location. The acquiring of this information may be a policy for all email classified as reservation email. The exemplary email system may also provide a mechanism for displaying additional information not included in the original email so that the recipient can easily view useful information that helps the recipient process the email.

An exemplary email system may then store the additional enhancement information in persistent storage (307). When the email system receives a request to access received email for a specific recipient (311), the system may display an email listing including the received email that is associated with an annotation using a visual representation informing the recipient of the annotation (319). The visual representation may be provided in various forms, such as icons, check boxes, buttons, or graphics. This representation should allow the recipient to readily distinguish email having an annotation from other email. The representation should also allow the recipient to clearly and easily process the email.

Figure 5:
FIG. 5 is a user interface illustrating an exemplary visual representation of annotations associated with email.

For example, a typical email inbox view contains information regarding received email as shown in FIG. 1. Information associated with received email may include: the email's sender, the email's subject, and the email's sent date. In an exemplary system, in order to distinguish or identify interactive emails, annotations and optional additional enhancement information may be displayed using a visual representation in the email listing as shown in FIG. 5. Although FIG. 5 shows an inbox view, annotations and enhancement information may be displayed in any email listing or conversation view.

Annotation visual representations may additionally be interactive. An exemplary embodiment displays annotations and optional additional enhancement information which are associated with a particular email in an email listing or conversation view, allowing the email recipient to act upon an email's annotations without opening the email as illustrated in FIG. 6. In the display of FIG. 6, the user does not have to open any of the four annotated emails (602, 604, 607, 608) in order to respond to the actions. Relevant information about the action may be displayed in-line.

Figure 8:
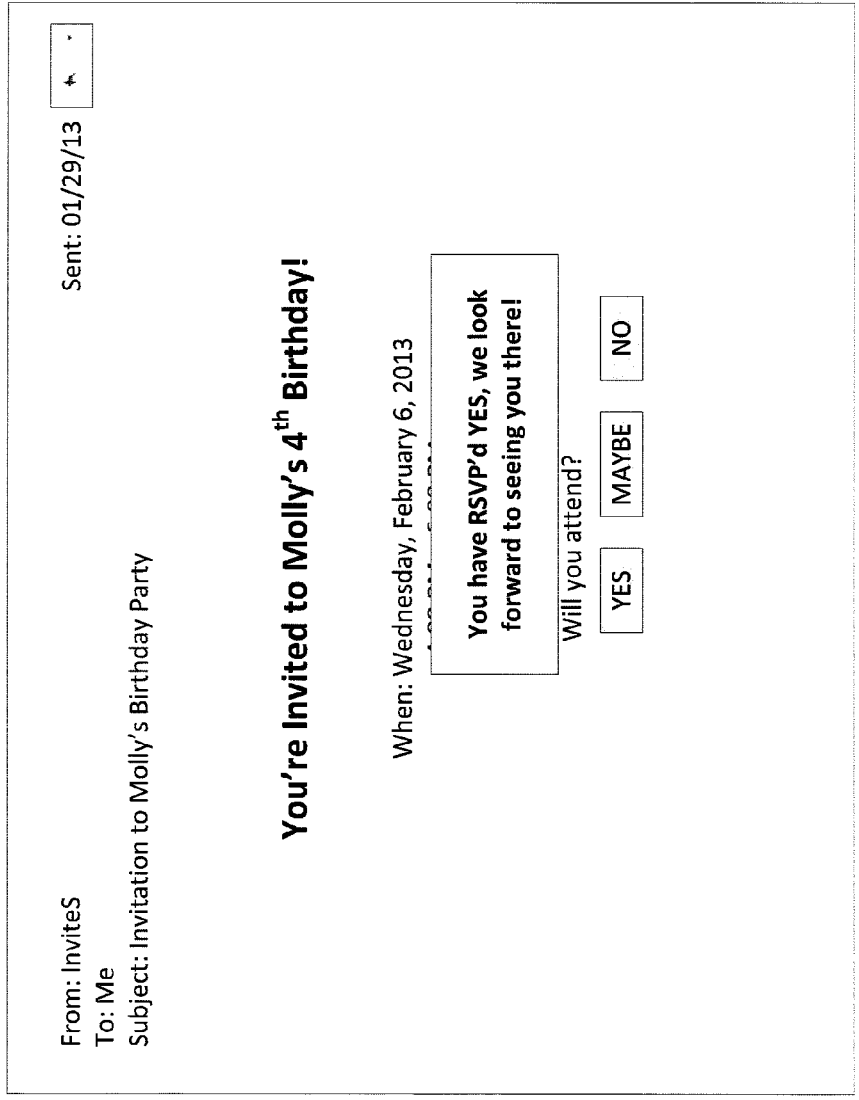
FIG. 8 is a user interface illustrating an exemplary visual representation of an annotation associated with an email.
Figure 9:
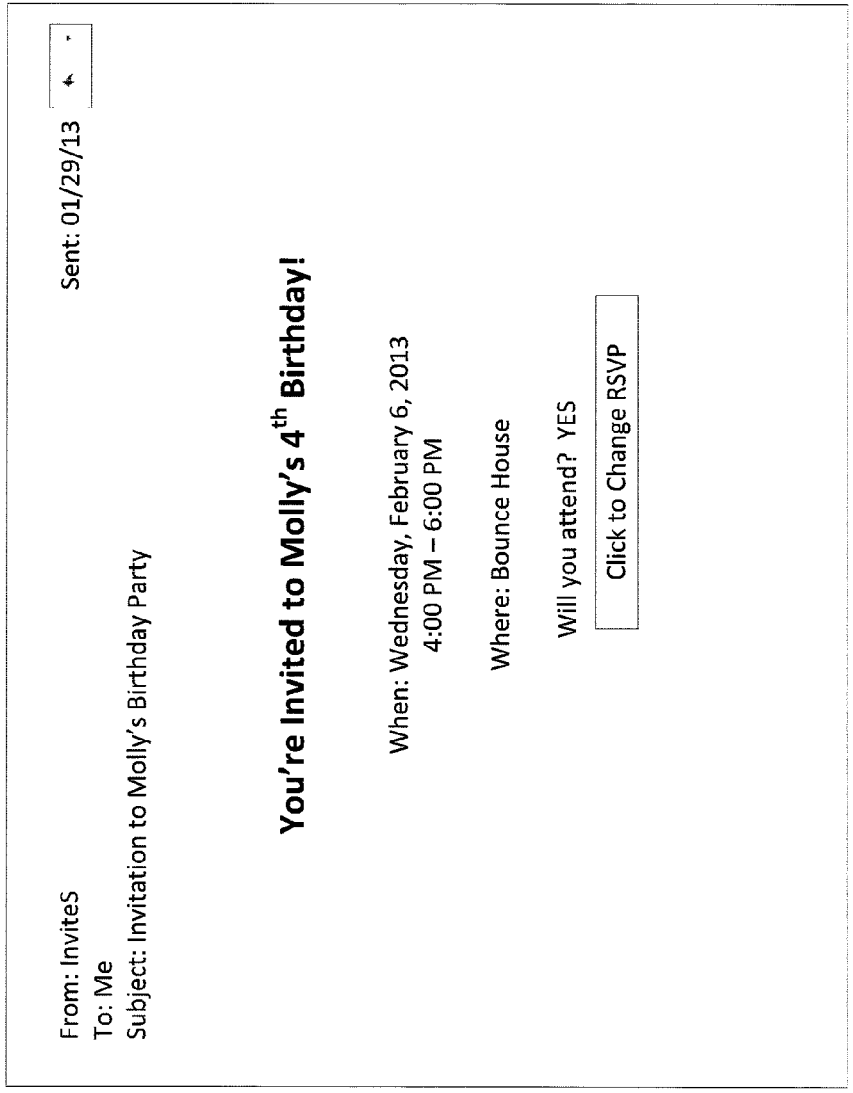
FIG. 9 is a user interface illustrating an exemplary visual representation of an annotation associated with an email.

In another exemplary embodiment, as shown in FIG. 7, the visual representation may be a rich interactive widget that includes code which allows a recipient to respond to annotations by opening a widget using a mechanism provided in an email listing view or conversation view, such as by clicking on RSVP in-line in FIG. 5. An interactive widget may be a pop-up window, a div, an i-frame, or some other element that allows enhanced content and relevant information to perform actions to be displayed to a user. The interactive widget may be accessed via a mechanism such as, but not limited to, a button, a URL, a rating, a drop-down menu, or a mechanism that is more specific to the type of thing that is being acted upon. Additionally, an interactive widget may allow a user to respond to the actionable annotations and respond to an email without leaving the email system to complete the action as shown in FIGS. 8 and 9. Responding to an email may entail sending a response to a third party service or another information source external to the email system. There may be a variety of communication/mechanisms for communication with external systems since external systems may have different requirements.

Once a recipient responds to an action associated with an email using an annotation, the action response is committed and saved in persistent storage (204) of the email system before the response is delivered to the email's sender. Actions and updates may be committed synchronously or asynchronously within the email system first and then delivered to third party services (216) in the background asynchronously or synchronously by the publisher service (214).

Figure 12:
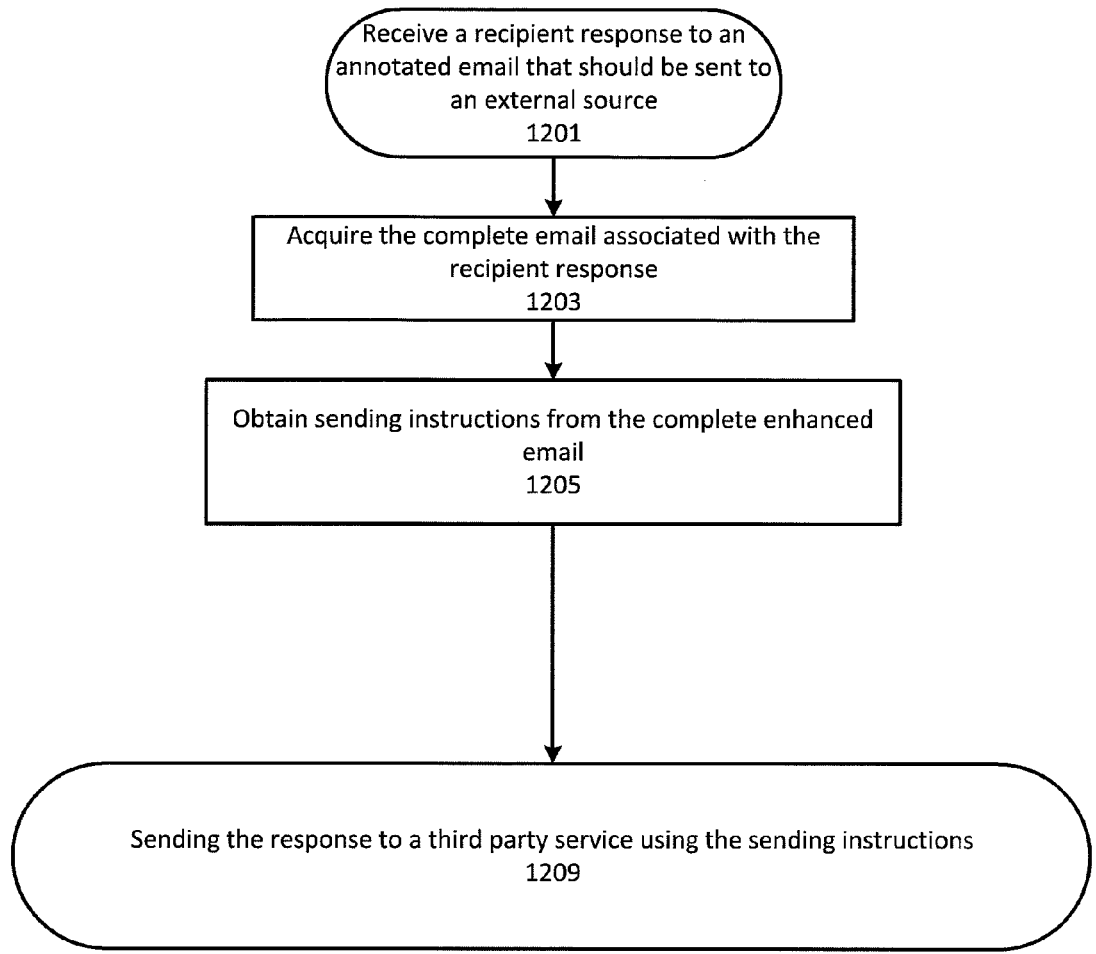
FIG. 12 is a flow diagram of an exemplary method for sending a response to an annotation to a third party service.

An exemplary email system may send responses from a recipient to third party services that sent the emails associated with the responses. A publisher service (214) centralizes outbound communications with third party services (216). Outbound requests may be made to third party services (216) to commit changes to actions made in the email system. As illustrated in FIG. 12, an exemplary method sending annotation responses to an external information source, such as a third party service, begins with receiving a recipient response to an annotated email that should be sent to the external source (1201). The publisher service then acquires the complete original email associated with the annotated email to retrieve sending instructions (1203, 1205). In some embodiments, the sending instructions are in the metadata of the received structured data. The response is then sent to the external source, such as a third party service, using the sending instructions (1209). In the RSVP example above, the publisher service (214) may send the RSVP "yes" response to the third party service (216) that sent the email invite using sending instructions provided in the structured data.

A trigger, remote procedure call, or some other mechanism (212) may be used to notify the publisher service (214) of new user responses. When the publisher service has been notified of the responses, the service (214) may then attempt to send the response to the appropriate third party service. In some instances, the publisher service may delay sending responses for a specified period of time. Additionally, the publisher service may try to resend responses to the appropriate third party services when the responses have not been successfully communicated to the services.

The publisher service (214) may be stateless and may support different transport mechanisms to interact with third party services (216) including, but not limited to HTTP and SMTP. Additionally, the publisher service (214) may support the structured data standard that defines how requests are to be made to the third party services (216). The structured data may describe the transport protocol to use, the possible parameters, the response object, and the url endpoint. For example, in the RSVP example, the structured data of FIG. 4 may specify that the transport protocol is HTTP. Response parameters may include: attendance, number of guests, and additional comments. The publisher may use the actions structured data from a specific email message to determine how to send the response to the third party service (216) that sent the message. FIG. 4 illustrates example structured data that can be used to determine how the publisher service (214) will make the request to the third party service (216).

The publisher service may also send responses to email on behalf of a user using SMTP when no structured data is included in an email. Instead of a user composing the reply using an email system interface, there may be a mechanism such as a button and the publisher service will send an email on behalf of the user. For example, a user may receive an email from a pharmacy indicating that a prescription may be refilled by the user responding to the email. In a conventional email system, the user has to open the email, type a response, and hit send to send a response to the prescription email. However, in an exemplary embodiment, the email system may display a "refill prescription" button to the user. When the user hits the reply button, the email system may save the response in persistent storage (204) and send the response to the publisher service (214). The publisher service (214) may then use SMTP instead of HTTP request to send a reply email to the pharmacy on behalf of the user. The publisher service (214) may additionally support authenticated requests to third party services (216). For HTTP, the authentication may be an open standard for authentication, such as OAuth2, or similar schemes.

After sending a response, the publisher service (214) may write back the response status from the third party service to the entry in persistent storage (204) corresponding to the appropriate email. When the email client fetches mail from persistent storage (204), the client may receive the new response from the third party service (216). This response can be shown to the user in the email system display. Once the third party service notifies the email system that the service has received the action, the email system may change the display for the user to indicate that action has been taken. For example, an email may have a check mark next to it. Additionally, when a response has been send to the third party service, but the email system has not yet received a response, a user may see a notification that the response has been sent to the third party service. A notification may be in the form of a notification bar indicating progress, for example.

While the publisher service (214) may handle outbound communications from an exemplary email system to third party services (216), inbound communications may be handled by a real time data service (218). Some third party services (216) may push real time data and updates to annotated email to the exemplary email system via the real time data service (218).

Figure 13:
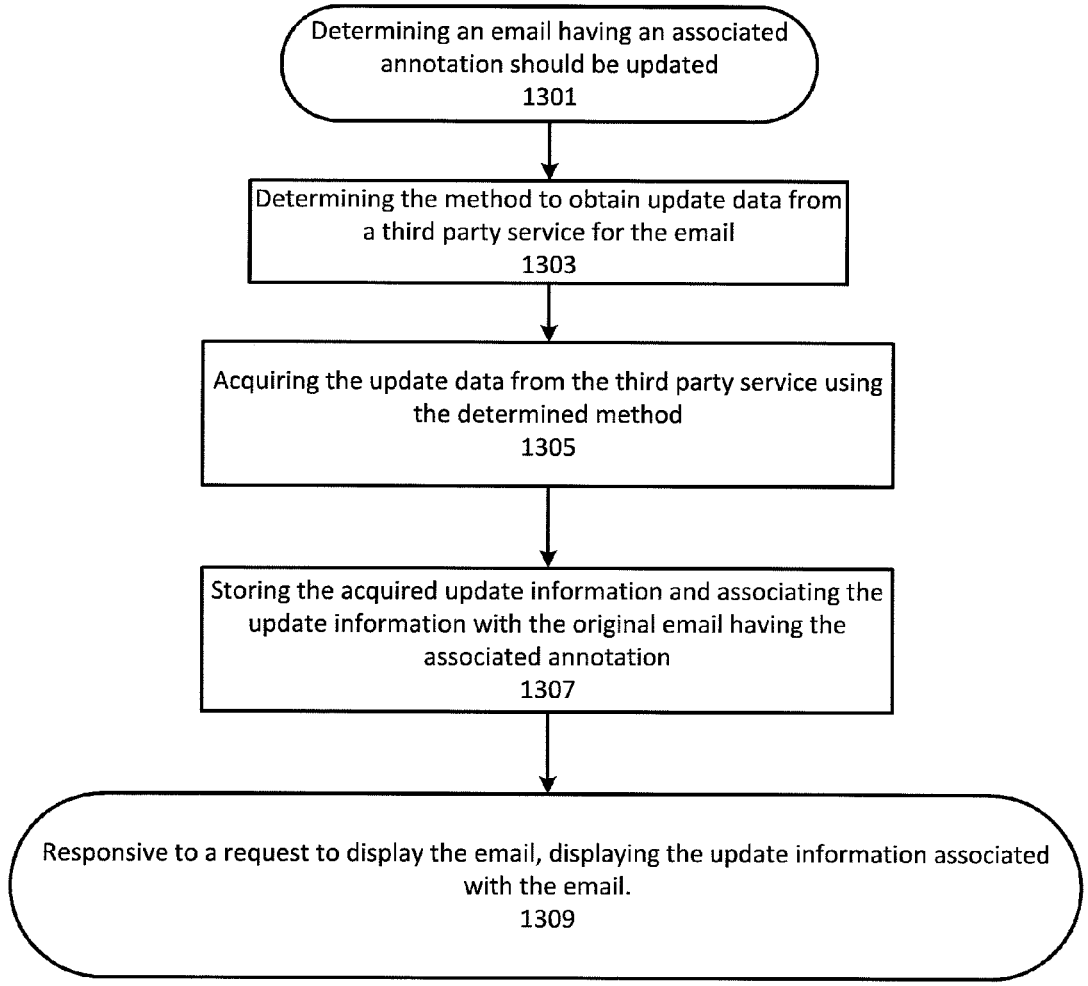
FIG. 13 is a flow diagram of an exemplary method for updating an annotation associated with an email via a third party service.

Other third party services (216) may provide email updates upon request by the real time data service. An exemplary method illustrated in FIG. 13 for the real time data service to update annotated email begins with the real time data service determining that an email which has an associated annotation should be updated (1301). The method for retrieving data from the appropriate third party service may then be determined (1303). Update data may be acquired from the third party service using the determined method (1305). The method may store the acquired update information, associating the update information with the original annotated email (1307). Upon request from a recipient to display the annotated email, the update information associated with the email may then be displayed (1309). For example, an email containing a flight number may be displayed to a recipient with an annotation that allows the recipient to view real-time information associated with the recipient's flight. Using the real-time data service, a recipient may be notified of the flight's status or gate number. In an email from a shipping company, a recipient may be able to track a package using real-time data. Additionally, real-time data may allow an email system to display a recipient's current reply status to an event even if the recipient replied using a different system.

An exemplary system may recognize changes regarding an email's status or the action associated with the email based on data received by the real time data service. Upon recognition of these changes, the system may update the displayed annotations, stop displaying email annotations, or continue displaying the same annotations. The exemplary system may change the displayed annotation associated with an email in instances where the email status has changed or the action associated with the email has changed. For example, an email containing a flight number may be displayed to a recipient with an annotation that allows the recipient to view real-time information associated with the recipient's flight. For example, a recipient may check-in for a flight. After the recipient checks in for the flight, the email annotation may then be updated to allow the recipient to modify his or her check-in information. After the day of the flight, the email annotation may be deleted from the email system or not displayed to the recipient since flight information or check-in information would no longer be relevant to a flight that has already taken place.

Another example for changing the annotation displayed with an email may be first displaying an annotation for creating a reservation at a certain restaurant based on an email conversation about the restaurant. Once a reservation has been created, the email system may display an annotation to modify or delete the reservation associated with the original email. After the day of the reservation, the email system may not display any annotation associated with the original email since the reservation is in the past.

Email updates in an exemplary system may contain structured data with a unique ID. The real time data service (218) may be able to associate the update with the original content using this unique ID. Merges and/or data updates may then be made to the email content that is displayed to the user. Other third party services (216) may use a public application programming interface to send updates to the real time data service (218). The real time data service (218) may receive and process all pushed events from services. However, most third party services (216) do not push data to other services. Therefore, the real time data service (218) may have to pull data and updates from these third party services (216).

Figure 10:
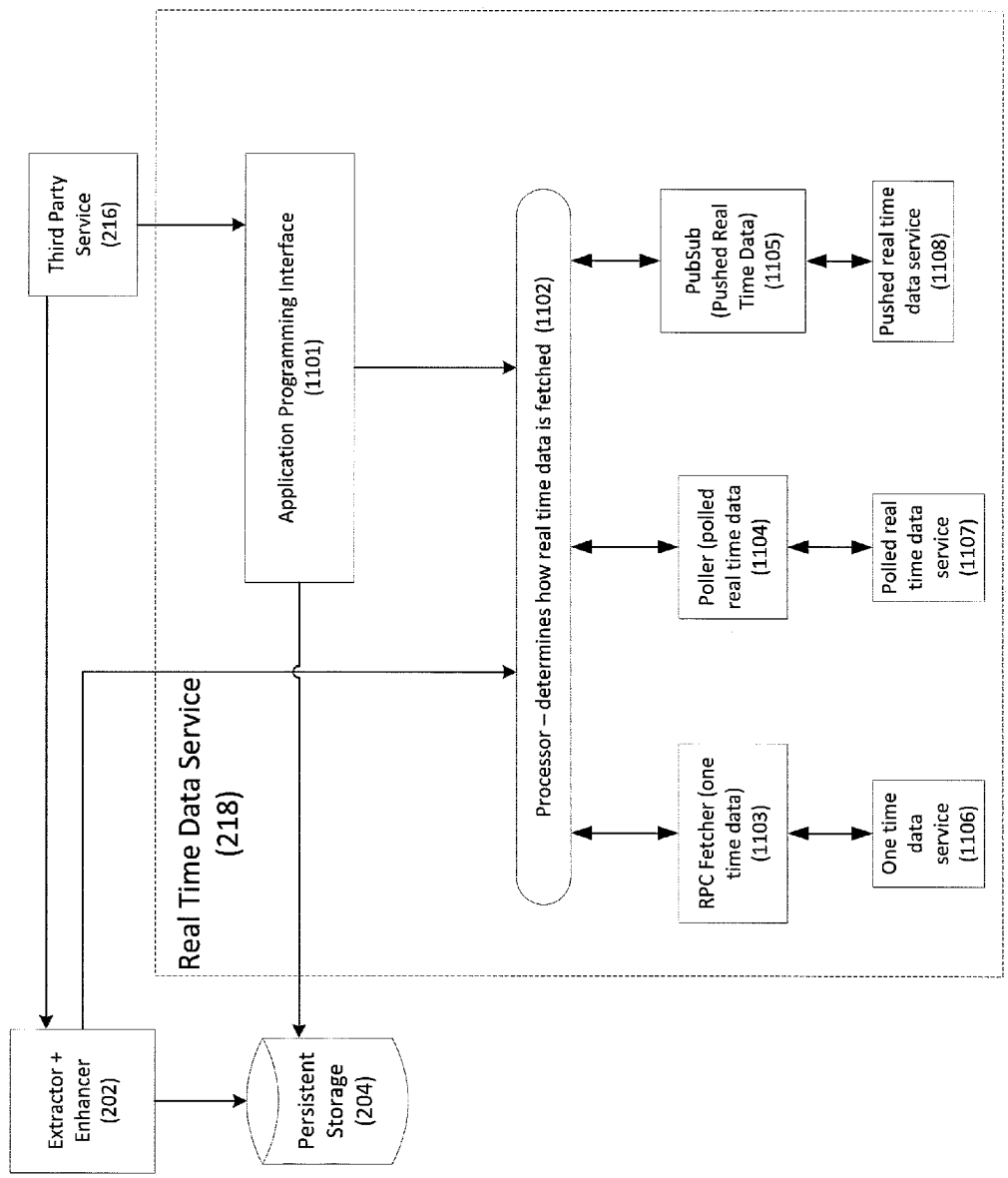
FIG. 10 is a block diagram illustrating an exemplary real time data service.

The real time data service (218) may fetch data at serving time or during background updates as illustrated in FIG. 10. Serving time refers to fetching the data for a particular email when the user reads the email. Background updates refers to detecting updates and storing the updates in persistent storage (204). The data is available the next time the email is read.

Several different kinds of data may be fetched from third party services (216). Data may include, but is not limited to: polled data (1104), pushed data (1105), and one-time data (1103). A processor (1102) may determine how real time data is retrieved based on the support protocols used in email metadata.

Polled data (1104) is data such as flight status and weather-related data. Pushed data (1105) may be data associated with events, reservations, or package tracking among other things. One-time data (1103) may include hotel or restaurant photos, celebrity profiles for concert events, and top menu items for restaurant reservations.

The real time data service (218) may provide a public API (1101) to support push updates. The service may also connect to various other services in order to collect real time data for user emails. Services (1106, 1107, 1108) may include: a flight status service, a weather service, a package tracking service, and a service for connecting with social media.

The real time data service (218) may also control the number of requests sent to a given third party service (216) in a certain amount of time. By controlling the flow to these third party services (216), the real time data service (218) can help ensure that a third party service (216) is not overwhelmed by the volume of requests it is receiving.

Static and real time attributes are associated with emails and stored in persistent storage (204). At serving time of the mail thread associated with the email, the attributes associated with the email are read and aggregated to generate the client side rendering of the email.

There may be instances in an exemplary email system when an email client requires immediate real time data. In those cases, the client may make direct requests to the real time data service (218). Requests may come in various forms including XMLHttpRequest (XHR) or remote procedural calls (RPCs).

Figure 11:
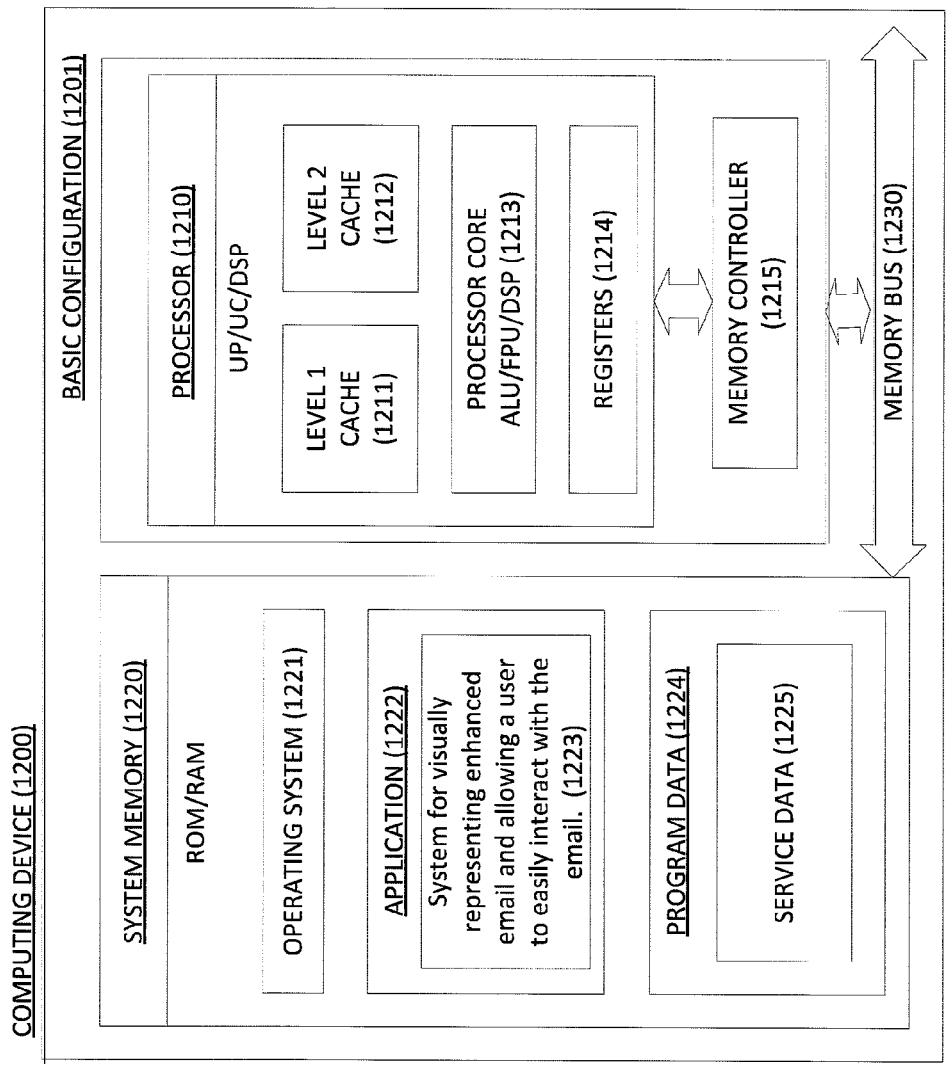
FIG. 11 is a block diagram illustrating an exemplary computing device.

FIG. 11 is a high-level block diagram of an exemplary computer (700) that is arranged for determining whether an email has an associated annotation and displaying a visual representation of the annotation and enhancement information related to the email so that a recipient can quickly and easily interact with the email. In a very basic configuration (1201), the computing device (1200) typically includes one or more processors (1210) and system memory (1220). A memory bus (1230) can be used for communicating between the processor (1210) and the system memory (1220).

Depending on the desired configuration, the processor (1210) can be of any type including but not limited to a microprocessor ($\mu P$), a microcontroller ($\mu C$), a digital signal processor (DSP), or any combination thereof. The processor (1210) can include one more levels of caching, such as a level one cache (1211) and a level two cache (1212), a processor core (1213), and registers (1214). The processor core (1213) can include an arithmetic logic unit (ALU), a floating point unit (FPU), a digital signal processing core (DSP Core), or any combination thereof. A memory controller (1216) can also be used with the processor (1210), or in some implementations the memory controller (1215) can be an internal part of the processor (1210).

Depending on the desired configuration, the system memory (1220) can be of any type including but not limited to volatile memory (such as RAM), non-volatile memory (such as ROM, flash memory, etc.) or any combination thereof. System memory (1220) typically includes an operating system (1221), one or more applications (1222), and program data (1224). The application (1222) may include a system for visually representing email. Program Data (1224) includes storing instructions that, when executed by the one or more processing devices, implement a system and method for visually representing annotated email and allowing a user to easily interact with the email. (1223). In some embodiments, the application (1222) can be arranged to operate with program data (1224) on an operating system (1221).

The computing device (1200) can have additional features or functionality, and additional interfaces to facilitate communications between the basic configuration (1201) and any required devices and interfaces.

System memory (1220) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of the device (1200).

The computing device (1200) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1200) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A publisher service method that centralizes all outbound communications between an email system and a third party service and is performed by a publisher service that is separate from the email system and the third party service, the publisher service method comprising:
    receiving, from the email system, a recipient response to an enhanced email, received by the email system from the third party service, to be sent to the third party service, the response being an action performed by a user on an interactive element included in or associated with the enhanced email;
    in response to receipt of the recipient response, acquiring, from a persistent storage, the enhanced email associated with the recipient response;
    determining whether the retrieved enhanced email includes structured data identifying a transport protocol for interacting with the third party service;
    in response to a determination that the retrieved enhanced email includes structured data identifying a transport protocol,
        creating a response message, including any required response parameters, based on the received recipient response; and
        sending the response message to the third party service using the identified transport protocol;
    in response to a determination that the retrieved enhanced email does not include structured data identifying a transport protocol,
        creating a response email to the enhanced email based on the received recipient response without requiring a user of the email system to draft a response; and
        sending the response email to the third party service.

2. The publisher service method of claim 1, wherein sending the response email to the third party service comprises sending an SMTP message to the third party service.

3. The publisher service method of claim 1, wherein sending the response message to the third party service comprises sending an HTTP message to the third party service.

4. The publisher service method of claim 1, further comprising using an open standard for authentication to support authenticated requests to third party services.

5. The publisher service method of claim 4, wherein an open standard for authentication is OAuth2.

6. The publisher service method of claim 1, further comprising:
    obtaining a response from the third party service; and
    writing the third party service response to persistent storage.

7. The publisher service method of claim 1, further comprising resending the response to the third party service if the response has not been successfully communicated to the service.

8. The publisher service method of claim 1, further comprising delaying sending responses for a specified period of time.

9. A system that includes a publisher service comprising:
    one or more processing devices and
    one or more storage devices storing instructions that, when executed by the one or more processing devices, cause the one or more processing devices of the publisher service to:
        receive, from an email system, a recipient response to an enhanced email, received by the email system from a third party service, to be sent to the third party service, the response being an action performed by a user on an interactive element included in or associated with the enhanced email;
        in response to receipt of the recipient response, acquire, from a persistent storage, the enhanced email associated with the recipient response;
        determine whether the retrieved enhanced email includes structured data identifying a transport protocol for interacting with the third party service;
        in response to a determination that the retrieved enhanced email includes structured data identifying a transport protocol,
            create a response message, including any required response parameters, based on the received recipient response; and
            send the response message to the third party service using the identified transport protocol;

in response to a determination that the retrieved enhanced email does not include structured data identifying a transport protocol,
create a response email to the enhanced email based on the received recipient response without requiring a user of the email system to draft a response; and
send the response email to the third party service;
wherein the publisher service performing the above steps is separate from the email system and from the third party service.

10. The system of claim 9, wherein sending the response message to the third party service comprises sending an SMTP message to the third party service.

11. The system of claim 9, wherein sending the response message to the third party service comprises sending an HTTP message to the third party service.

12. The system of claim 9, further comprising using an open standard for authentication to support authenticated requests to third party services.

13. The system of claim 12, wherein an open standard for authentication is OAuth2.

14. The system of claim 9, further comprising:
obtaining a response from the third party service; and
writing the third party service response to persistent storage.

15. The system of claim 9, further comprising resending the response to the third party service if the response has not been successfully communicated to the service.

16. The system of claim 9, further comprising further comprising delaying sending responses for a specified period of time.

* * * * *